United States Patent [19]
Fulton

[11] Patent Number: 5,390,104
[45] Date of Patent: Feb. 14, 1995

[54] ADAPTIVE CONTROL MAN-AUGMENTATION SYSTEM FOR A SUSPENDED WORK STATION

[76] Inventor: Francis M. Fulton, 20090 S. Mountain Rd., Santa Paula, Calif. 93060

[21] Appl. No.: 31,956

[22] Filed: Mar. 16, 1993

Related U.S. Application Data

[63] Continuation-in-part of Ser. No. 503,379, Apr. 2, 1990, Pat. No. 5,196,998.

[51] Int. Cl.⁶ .................. B66F 11/04; G06F 15/46; G01C 9/06
[52] U.S. Cl. .................. 364/167.01; 182/2; 182/148; 33/366
[58] Field of Search .................. 364/167.01, 478, 479; 414/273–275, 469, 486, 501, 505, 508; 56/328.1; 406/39; 182/219, 148; 212/165; 33/366

[56] References Cited

U.S. PATENT DOCUMENTS

| | | | |
|---|---|---|---|
| 3,878,957 | 4/1975 | Rempel | 56/328.1 |
| 4,514,796 | 4/1985 | Saulters et al. | 364/182 |
| 4,691,805 | 9/1987 | Kishi | 182/2 |
| 4,724,924 | 2/1988 | Breyer et al. | 182/2 |
| 4,862,172 | 9/1987 | Ross | 341/157 |
| 4,910,662 | 3/1990 | Heiser et al. | 364/167.01 |
| 4,912,662 | 3/1990 | Butler et al. | 364/559 |
| 5,007,772 | 4/1991 | McKenna et al. | 56/328.11 |
| 5,088,020 | 2/1992 | Nishida et al. | 364/167.01 |
| 5,107,954 | 4/1992 | Fujimoto | 182/2 |
| 5,172,481 | 12/1992 | Wiseman et al. | 33/366 |
| 5,196,998 | 3/1993 | Fulton | 364/167.01 |
| 5,237,753 | 8/1993 | Carlson et al. | 33/366 |

Primary Examiner—Roy N. Envall, Jr.
Assistant Examiner—Thomas E. Brown
Attorney, Agent, or Firm—David O'Reilly

[57] ABSTRACT

An adaptive control man-augmentation system controls the movement of a suspended work station. A support structure, usually mounted on a chassis, has an extendible boom and a work station at the end of the boom. A directing member pivots in accordance with operator movements and the pivotal movement is resolved along three axes, normal to each other and at any point in time having a fixed but readily alterable relationship the boom. Resolving of the movement provides signals for moving the boom so as to move the work station to any desired location and orienting the work station, in response to operator movements. The position of the work station and other selected functional system are monitored. The signals are continuously processed and outputs adapted with respect to situation variables to produce immediate and accurate operational responses of the workstation to match operator requirements.

9 Claims, 11 Drawing Sheets

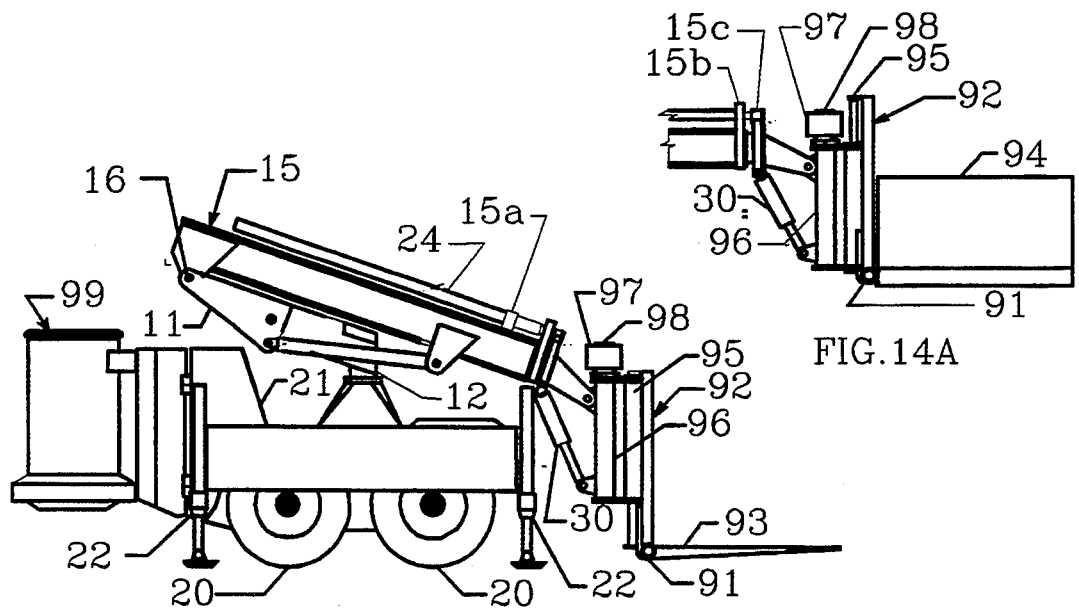
FIG.14A
FIG.14
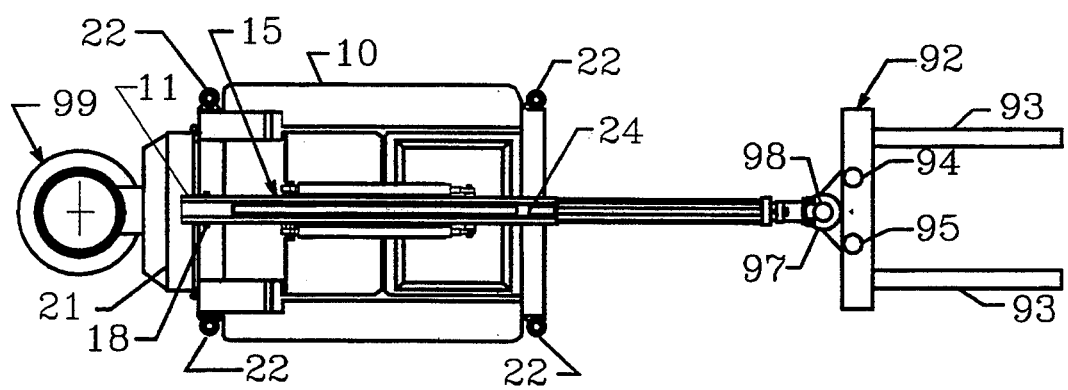
FIG.15
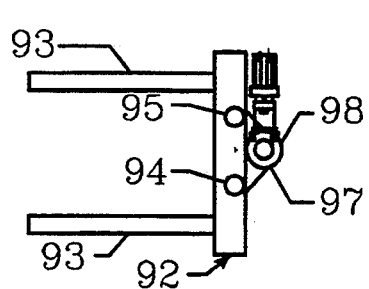
FIG.15B
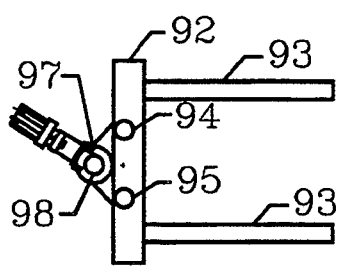
FIG.15A

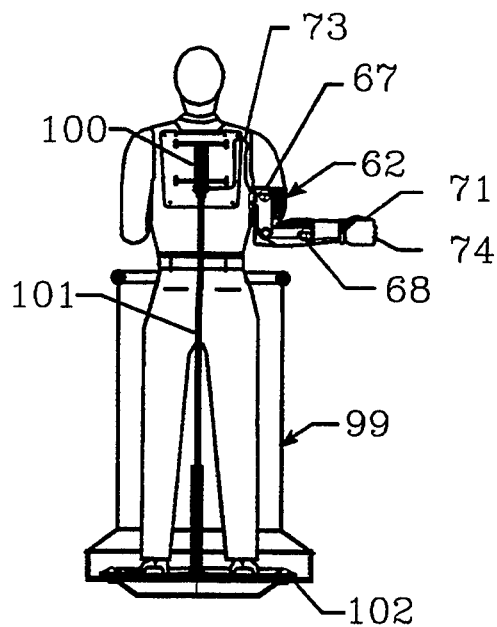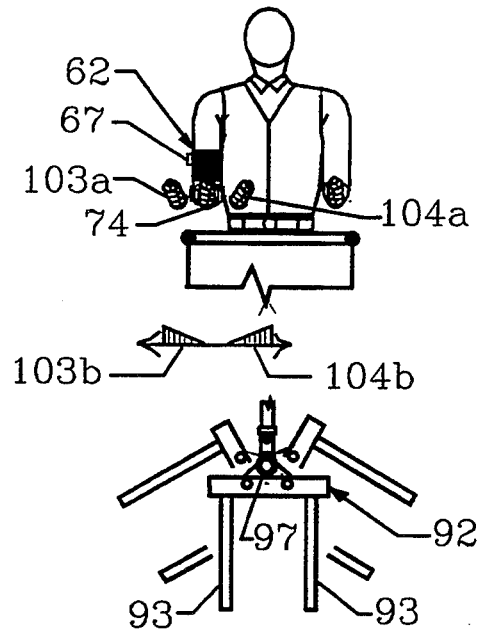
FIG. 16
FIG. 17A
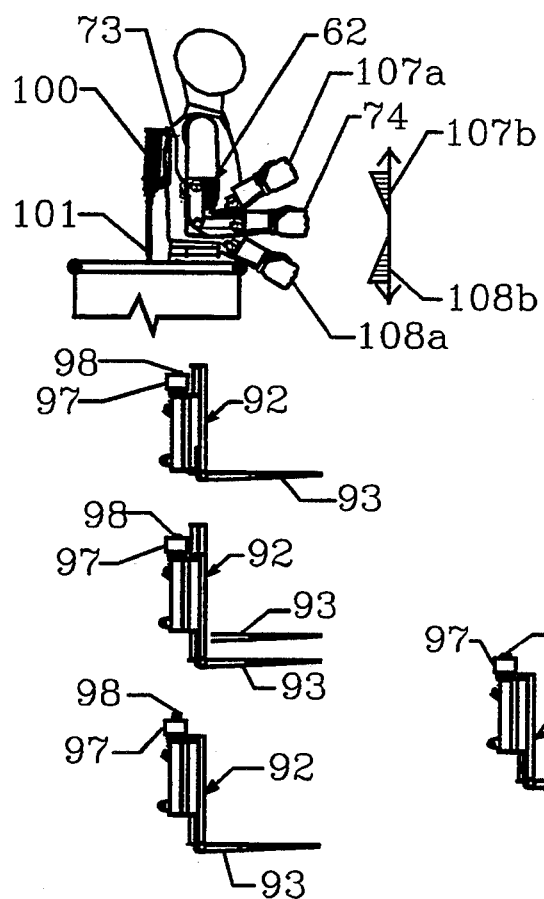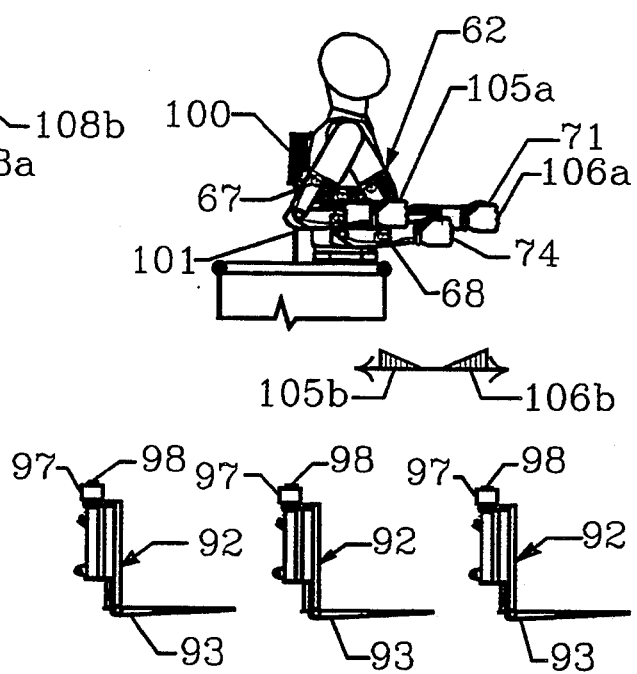
FIG. 17C
FIG. 17B

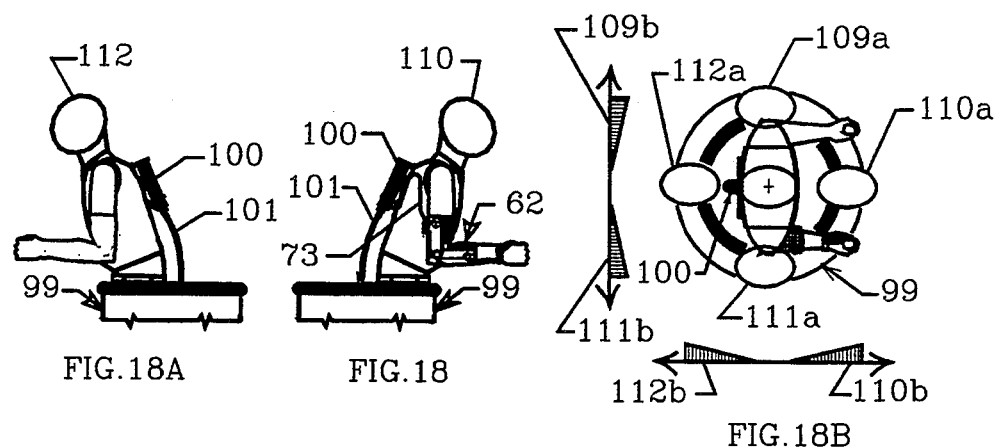
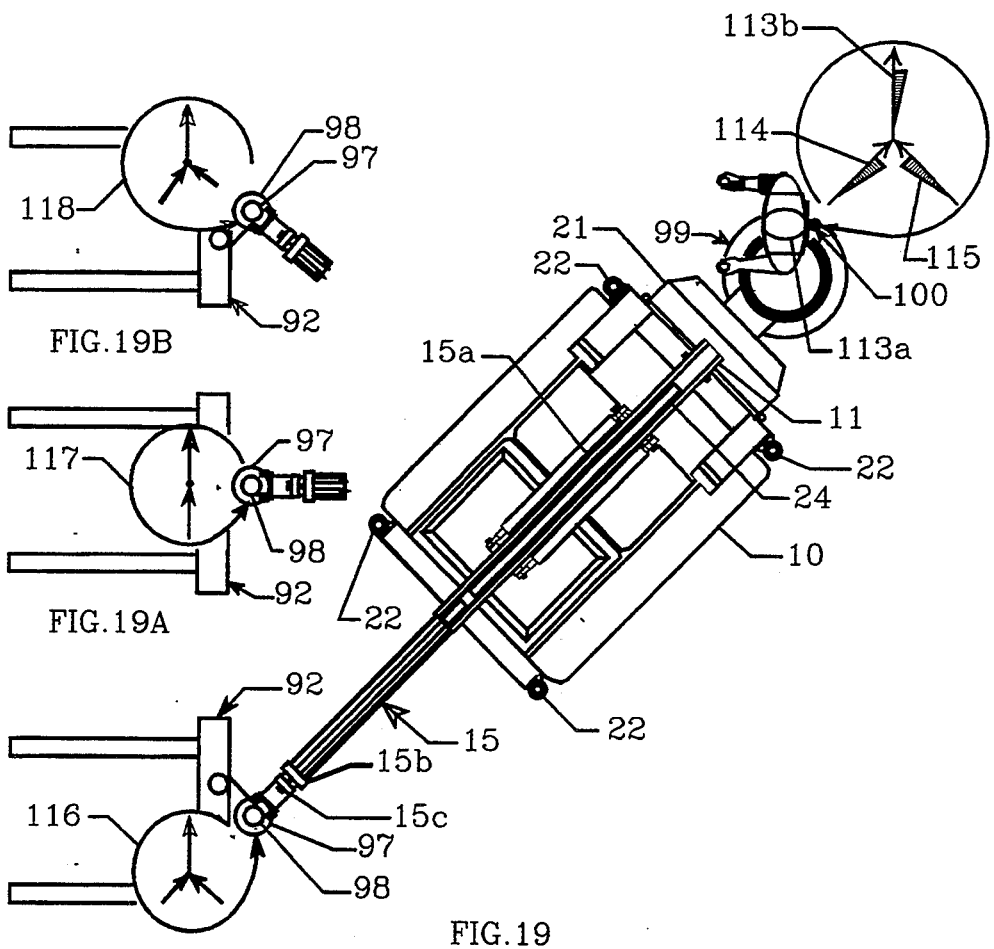

ADAPTIVE CONTROL MAN-AUGMENTATION SYSTEM FOR A SUSPENDED WORK STATION

CROSS-REFERENCE TO RELATED APPLICATION

This application is a continuation-in-part of application Ser. No. 07/503,379 filed Apr. 2, 1990, now U.S. Pat. No. 5,196,998.

FIELD OF THE INVENTION

This invention relates broadly to an adaptive control man-augmentation system for moving and orienting suspended work stations. Particularly, though not exclusively, the invention relates to the task coordinated controlled movement of platforms, load manipulations, tree pruners and such other task performances apparatus by workers.

BACKGROUND OF THE INVENTION

A typical example of such apparatus is the work platform which supports a fruit picker, where the invention provides for controlled movement and positioning of such platform continuously or intermittently as directed by the picker while he is simultaneously performing fruit location, detachment and disposal tasks. In some instances, the operator may not be positioned on the work station but on the ground or some other point on the machine structure. An example of such use is in pruning in which a remotely controlled articulated cutter can be mounted at the workstation, the operation of positioning the cutter and operating the cutter being carried out by an operator at some other position, for example, on the ground.

In its broadest aspects the present invention is useful in any equipment situation in which it is desired to position a worker and/or other task effectors in various spatial locations to enable them to carry out task operations. Such operations include the fabrication or inspection and repair of mechanical structures, the application, restoration or removal of decorative embellishments, or the transportation placement and retrieval of equipment or materials, and other situations wherein three dimensional positioning of the worker and spatial orientation of the task effectors is necessary. For purposes of the present specification, preferred embodiments of the invention will be described as utilized in a tree crop servicing apparatus, a load manipulator apparatus and a bulk handler apparatus.

Several structures, both mobile and stationary, have been proposed heretofore to elevate and position a worker adjacent to various tree branches in order to facilitate multi-positional tasks such as pruning, pollinating and harvesting tree crops. As an example, fruit pickers are supported on a platform, which may be in the form of a bucket, and the platform be suspended by means of a powered, articulated structure that can be moved to bring the picker into a picking position. It has also been previously proposed that an electro-hydraulic control system be provided for actuating the various members of the support structure in response to the task related positioning of a picker's body and thereby to move the platform in a desired direction and at a desired rate. One such system is described in U.S. Pat. No. 3,384,201. In this example, the platform is mounted on a rectilinear arm configured to provide planer in-and-out movement. This arm is in turn mounted on a vertical lift-boom. Sideways movement of the platform is provided by rotation of the boom. The apparatus has control limitations that make it applicable only to vehicles with support structures that embody rectilinear movement in the vertical plane. The bucket platform's movements are controlled by direct actuation of various electro-hydraulic controls using inputs generated by task related movements of the body of the person on the platform. This restricts the application and adaptability of the apparatus.

In order to optimize man-machine task efficiency in fruit picking and in other extended volume multi-positional tasks, it is essential that movements of the work station be the product of task related directive inputs by the worker utilizing the equipment. Movements of the work station must be quick and accurate and at all times must be closely matched to the natural stimuli-decision-action capabilities of the human operator. Juxtaposed against these platform positioning performance requirements is the fact that the simpler and more efficient movable platform suspension structures are inherently non-linear in their directional and rate responses when driven by general purpose movement actuators. The picker's body actuated control inputs and the relatively complex rectilinear vertical plane platform movement features engineered into the system defined in U.S. Pat. No. 3,384,201 are one approach to meeting these mobile platform performance requirements.

In accomplishing the required level of work platform mobility and situational flexibility there is an even more important requirement. It is that the entire powered structure and its control system embody the highest achievable levels intrinsic operational safety. The difficulties in achieving these fundamental objectives are compounded by the operational environment within which the man-machine system must be able to function. Tree crop service tasks are among the most demanding of these environments. Typically a picker must work continuously from the platform with his principal attention focused on the location, detachment and disposal of the tree crop. His task requires that he move around all of the leaf line surface of each tree with periodic penetrations into the limb structure to collect interior fruits. When his platform mounted product container is filled he must rapidly move to bulk handling containers, avoiding all intervening tree and machine structure, and empty his collector container. He then must rapidly and safely retrace his path back to the current harvesting point.

When the tree crop located within the current work envelope of his machine is harvested, the operator must dock his work station on the machine and move the unit to its next harvesting position. The equipage must be capable of operating on tilled fields, ofttimes crisscrossed by furrows, berms or ditches. It may also be required to be capable of operating in untilled orchard areas, and hillside groves. To transit such terrain it must have a base carriage with excellent traction and low center-of-gravity when in the platform-docked configuration. To insure a full measure of stability under all terrain conditions where the mobile platform may be reasonably expected to operate, the base platform of the assembly may be equipped with a self-leveling outrigger system. Tree crop groves and orchards are usually characterized by rows of trees planted to maximize per acre production. As these trees mature the clear space between the rows narrows, sometimes to the point where the upper limbs begin to intertwine. Even in these narrow and canopy cluttered corridors the machine and its mobile platform must be capable of operating safely and with high task efficiency.

With the foregoing requirements and considerations in mind, one of the primary objectives of the present invention is to provide a greatly improved tri-dimensional mobile work station apparatus; one that is capable of providing full augmentation to an operator's manifold task performance requirements in a dynamic work environment, and also equally able to simultaneously monitor and actively contribute to operational safety on a situational basis.

More particularly it is an object to provide an improved tri-dimensional mobile work station apparatus incorporating a multi-function adaptive control system capable of deriving spatial positioning directives by monitoring operator body positioning, to then condition the response to these directives in a process that takes into account apparatus situational variables and applies a full resident structure of operating criteria, and then to either generate the appropriate platform movement response or intervene in the execution of such directives when established safety or capability determinates would be violated.

BRIEF DESCRIPTION OF THE INVENTION

The present invention can be applied to various forms of machine, with any powered articulated work station suspension system including rotatable telescopic boom machines, for a variety of purposes and with various modes of operation.

Broadly, there is provided means for the controllable movement of a work station comprising; sensing members for detecting the key directing movements of an activator or directing member as moved by an operator, means for resolving movement of the directing member relative to certain axes, means for producing signals related to such movement, means for actuating members of a support structure whereby the work station is moved to any desired location, and means for continuously monitoring positional and other operational factors. Means for continuously adapting control inputs to structural actuators in accordance with current situation variables produce immediate, accurate movement responses matched to the operators directives. Thus, the control system detects movement of a directing member relative to certain axes and produces outputs related to such movement to produce movement of a work station in the same or a situationally selectable relation to said axes.

Applied to a fruit picking apparatus and operated in a direct response mode, the directing member is connected to the picker's body and when horizontal movement is required, the picker leans or reaches in the desired direction of movement, resulting in matching directional movement of the platform at a rate proportional to his angle of part positioning. Vertical movement of the platform and picker are directed in an analogous manner by step-up step-down movements of either of the pickers legs. The directing member for the horizontal movements is flexibly connected to the remainder of the control system, allowing complete freedom of movement of the picker within the picking bucket.

The signals produced by the directing member are transferred to a microprocessor based central control processor which maintains continuous track of the platform support systems configuration and provides for the controlled movements of various members of a machine to provide the desired positioning in an efficient and safe manner. In other operations the operator station may be located at some other position on the apparatus or even on the ground. In such instances the operator interface or directing member employed to direct the work platform or other task effector can be readily restructured to optimize the employment of the operator's natural task related body movements to direct the apparatus's task performance actions.

The flexibility of this type of control system is such as to permit ready tailoring of the interface to special needs or handicaps of individual operators.

In the particular example of a machine system configured for the application of the invention for fruit-picking and similar operations, there is provided a pedestal mounted for rotation about a vertical axis, a telescopic boom pivotally mounted at one end atop the pedestal for movement about a horizontal axis; a work platform pivotally mounted at the other end of the telescopic boom; means for independently rotating the pedestal, elevating the boom and extending and retracting the boom; and control means for actuation by a user for producing and controlling the movements of pedestal and boom whereby the platform is moved to a desired position. Means may also be provided for moving other elements: for example, for rotating and positioning the platform and/or task effectors relative to the boom. Means for moving this articulated work platform suspension structure into, through-out and from the task environment may be provided in the form of a work terrain capable, powered carriage. Where appropriate this carriage can be fitted with an outrigger system that automatically expands the ground support base and levels the suspension structure before movement of the work platform from its docked position is permitted.

With the foregoing arrangement, there is provided a very simple, efficient and reliable engineering structure wherein the platform frame and thus the person and/or task effectors carried thereby may be spatially transited and positioned along any task defined tri-dimensional pathway quickly and without undue strain on the various parts.

The continuously adaptive control means, installed into the support structure and the operator interface, integrates a means for deriving machine system movement directives from operator task related body movements, processing these directives with a programmable microprocessor; a multi-channel means of continuously monitoring a network of compatible analog and/or digital physical state sensors, a multi-channel means for supplying continuously variable analog voltage or current control outputs, and a compatible electro-hydraulic and/or electro-mechanical means for proportionally actuating the elements of the platform support structure in accordance with the control outputs. Through this combination of structure and control the invention is able to quickly, accurately and reliably afford both directional and rate controlled responses to the operators tri-dimensional movement and positioning directives. The control processes incorporated into this invention are inherently capable of being programed to readily and continuously modify structural movement responses in accordance with situational variables, including selectable alternate modes of task processing.

The above and other novel features and advantages of the invention will be more readily understood from the following detailed description of certain embodiments, by way of example, in conjunction with the accompanying drawings in which:

BRIEF DESCRIPTION OF THE DRAWINGS

FIGS. 14 and 14A are side views of the basic vehicle illustrated in FIGS. 1 through 5, configured with an articulated lift platform directed by an operator in a controller station mounted on the vehicle structure.

FIG. 15 is a top view of the vehicle as illustrated in FIG. 14.

FIGS. 15A and 15B are partial views illustrating the positional flexibility of the lift platform in horizontal planar movement.

FIG. 16 is a plane view of a director interface configuration, that integrates both vest and arm-mounted control output sensors, installed aboard a controller platform.

FIGS. 17A, 17B, & 17C illustrate diagrammatically the relationships between arm positioning and selected machine repositioning responses.

FIGS. 18, 18A and 18B illustrate pictorially and diagrammatically how directive movements of the man's torso movements serve to generate biaxial, proportional, control output directives for moving he work platform attachment point in the horizontal plane.

FIGS. 19, 19A and 19B illustrate diagrammatically and pictorially how the adjunct computer serves to continuously transpose the horizontal plane directive inputs into discrete activator outputs and consequent work platform positioning.

DETAILED DESCRIPTION OF THE INVENTION

Figure 1:
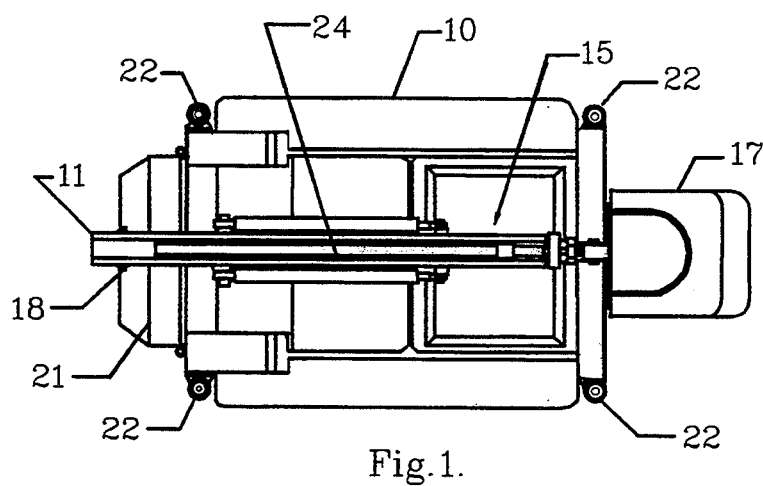
FIG. 1 is a top plan view of one form of vehicle embodying the invention and configured for man-occupied work station operations.

FIGS. 1 to 5 illustrate one embodiment of the invention in the form of an apparatus comprised of a powered chassis (10), having an elongated pedestal (11) mounted at one end (12) on a central pillar (13). The pedestal (11) can pivot on the pillar about a vertical axis. At the other end of the pedestal (11) is mounted a telescopic boom (15). The boom is pivotally mounted at one end on a pivot (16) for elevation about a horizontal axis. In the example, the boom (15) has one fixed (15a) and two extendible (15b & 15c) sections. At the end of the boom, remote from the pivot (16), is mounted a platform or work station (17), that is in the example illustrated in the form of a bucket.

The chassis, mobile on wheels (20), has a power source (21) at the rear end. The power source (21) includes a hydraulic pump for operation of the pedestal, boom, stabilizers and other features. For example, the pedestal can be rotated by a hydraulic motor, while the boom is lifted by hydraulic rams (23) and sections of the boom are extended also by hydraulic rams (24). Further hydraulic rams (30) are used to maintain the work platform at a constant level attitude while the suspension structure is rotated, raised and lowered into any spatial position. Outriggers (22) are employed to provide an expanded support base and to pre-level the machine at each location where the support structure is to be deployed.

Figure 2:
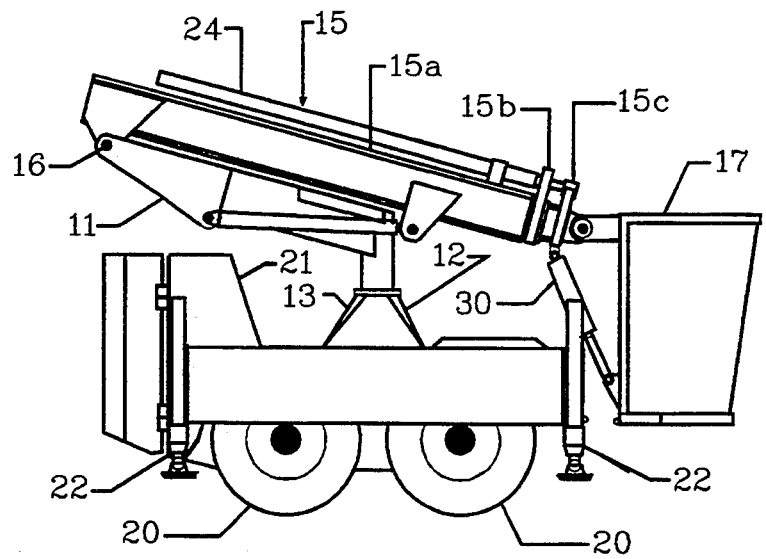
FIG. 2 is a side view of the vehicle as illustrated in FIG. 1.

FIG. 2 illustrates the apparatus from the right side and with the work platform docked in the ground traveling configuration.

Figure 3:
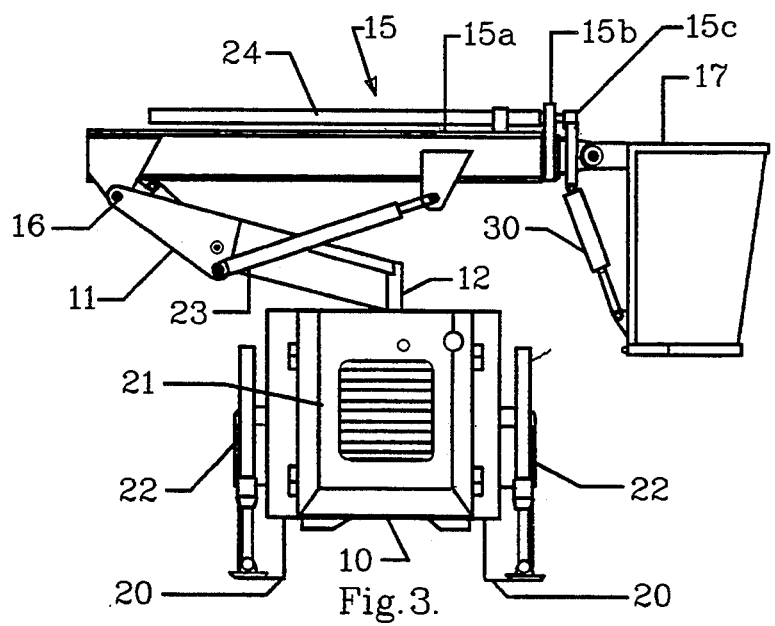
FIG. 3 is an end-view of the vehicle as in FIGS. 1 and 2, but with the boom extending transversely.

FIG. 3 is a rear view that illustrates the pedestal (11) and boom (15) extending transversely, the pedestal (11) having pivoted on the pillar (13).

Figure 4:
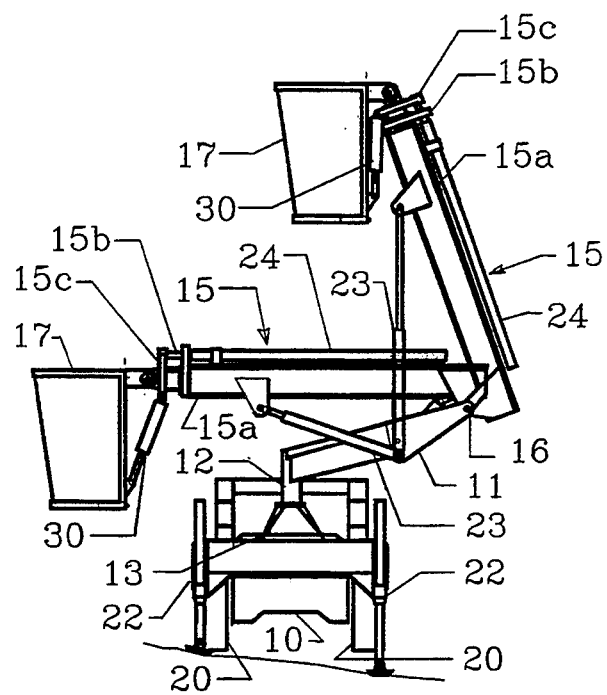
FIG. 4 illustrates the various man-occupied platform positions at the side of the vehicle.
Figure 5:
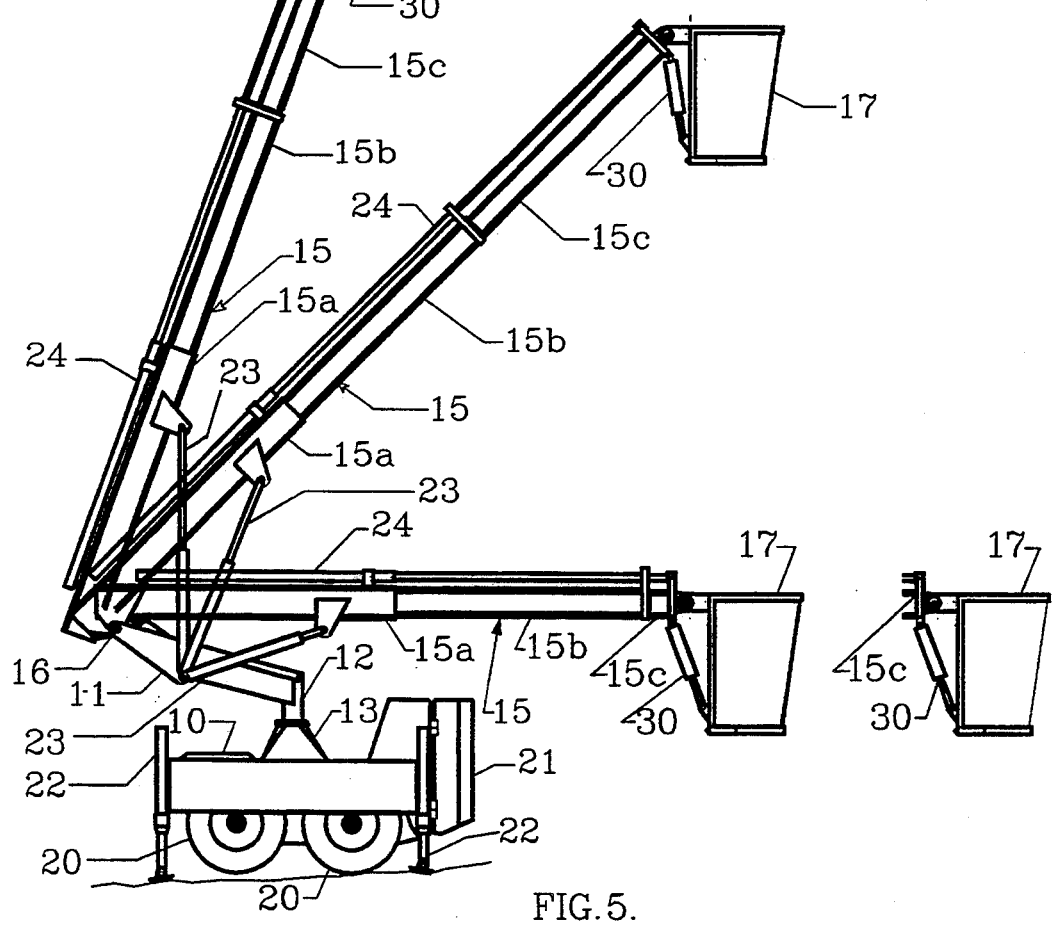
FIG. 5 illustrates various man-aboard platform positions at the rear and above the vehicle.

FIGS. 4 and 5 illustrate the apparatus in use. In the front end view presented as FIG. 4, the pedestal and boom are positioned transversely, with the unextended boom being shown in two different positions: one at maximum elevation with the platform (17) above the chassis, the second with the boom at an intermediate position extending sideways at an intermediate height for the platform. In FIG. 5, the pedestal and boom extend along the fore and aft axes of the chassis, the boom in four different configurations: one showing the platform (17) positioned at maximum height; a second with the platform at intermediate height and forward position; and finally with the boom level and the platform extended to intermediate and full out positions.

It will be appreciated from inspection of FIGS. 1 through 5 how this invention employs a rough-terrain capable carriage unit to transport and position the work platform and its mobile suspension structure throughout any extended worksite area, for instance an orchard. It will also be appreciated how this assembly is fitted with a powered outrigger system that can provide a level, stable suspension structure base of requisite dimensional size to accommodate pronounced slope and/or surface irregularities within such a worksite area. It will be further appreciated how a mechanically simple boom structure capable of being rotated 360 deg. or more about a vertical axis, elevated 90 degrees or more about a horizontal axis and telescopically extended and retracted linearly along the boom axis is employed to move a constantly leveled work platform along any unobstructed path and to any selected point within the hemispheric volume defined by the boom's maximum and minimum extension radii.

In order to realize the full task performance potential of the platform in applications such as tree crop harvesting, a man-linked control interface is incorporated into the work platform (17). This interface provides the necessary span of control actuating sensors needed to receive, translate and transmit machine response directives originated by a picker, or other operator, to all machine actuator elements that must be employed to meet each directive. The control interface is designed to monitor the natural task-related movements of the pickers body as the source of these directives. The means for accomplishing this man-machine linkage is illustrated in FIGS. 6A, 6B, 6C, & 6D.

Figure 6A:
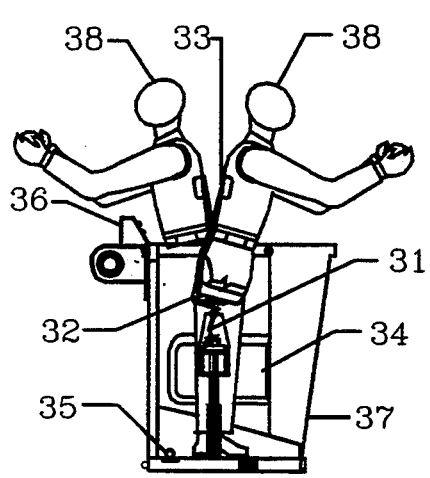
FIGS. 6A, 6B, 6C, & 6D illustrates diagrammatically the relationship between an operator and a saddle-located directing member and other controls.
Figure 6B:
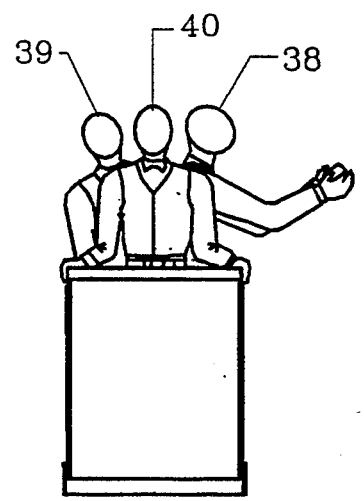

A means for detecting and resolving directives from the picker for movements and positioning of the work platform in the horizontal plane is illustrated in FIGS. 6A and 6B. The directing member (31) is attached to the picker's body trunk, by means of a seat (32) and/or vest (33), and moves in accordance with movements of the picker. Thus, the directing member can be moved in a forward (38) or backward motion, in a sideways motion (39) or in a combination of such motions, from an upright position (40), depending upon the picker's movements. Also, means for detecting a leg movement indicative of a desire for an upward or downward movement is provided. This is described later with respect to FIGS. 6C and 6D.

Operation is as follows: When the operator leans in any direction, his movement is detected by the directing member (31), which moves in unison. This member incorporates two lever driven inclinometer elements positioned at right angles to each other in the horizontal plane. One element is fixed in position to measure angular displacement in the vertical plane oriented along the support-arm work-platform axis; the second is positioned to measure angular displacement in the cross-axis vertical plane. The vest (33) and seat (32) linkage to the picker's body trunk is mounted on a ball-swivel vertical axle that permits the picker to lean in any direction. It is attached to this axle by a free turning bearing that permits him to continuously orient his body to face in any desired direction. Arranged in this manner the actuating member serves to continuously resolve picker body angular attitudes into two orthogonal components and to generate voltage outputs proportional to each angular component.

The output of the axially aligned inclinometer is then transferred through an on-board microprocessor to the electro-hydraulic proportional output control valve, which extends and retracts the boom. Simultaneously, microprocessor generated signals are also sent to the control valve, which causes pivoting of the boom about pivot (16), so that the platform is maintained at the same height. Similarly, outputs of the cross-axially aligned inclinometer transmit a signal through the microcomputer to the control valve which controls the rotation of the pedestal on the pillar. The result of these processes is planar movement by the platform that is matched to picker direction of lean, and where the rate of such movement is proportional to the degree of such directive lean. The platform can thereby provide the same movement responses that the operator normally experiences when moving about on his own legs.

Figure 6C:
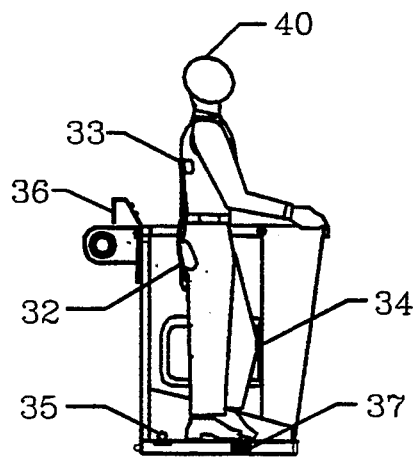
Figure 6D:
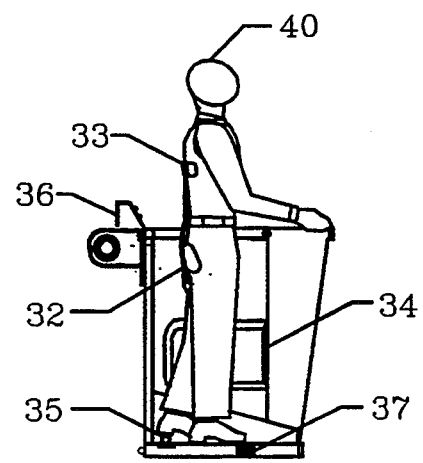

FIGS. 6C and 6D illustrate how analogous picker body movements are employed to signal and control vertical movements of the work platform. The directive signal for upward movement by the platform is derived from knee pressure by the picker against a sensor pad (34) attached to the wall of the inner bucket. This pad can be configured to provide output voltage signals proportional to the pressure exerted by the picker, or only on/off output as appropriate. Downward movement directives are produced by pressure of the picker's foot on a linear or circumferential sensor (35) mounted on the floor of the platform. Here again this sensor can be configured to provide proportional or on/off outputs. A "master control" or "dead man's" switch (39) which must be activated before any movement by the support structure can occur, is provided.

As is the case for the horizontal movement output directive signals, the signals delivered by the up and down sensors are transmitted through the microprocessor to the control valve which causes pivoting of the boom about pivot (16). Again the microprocessor is used to simultaneously output control signals to the control valve that produces boom extension movement (15) to provide rectilinear up and down movement by the work platform. By combining up or down directives with simultaneous planar motion lean directives coordinated tri-dimensional movement and positional control are readily and naturally achieved.

Conveniently, the directing member detecting and indicating movements of the operator's body sends its signals to a microprocessor, which in turn sends appropriate electrical control signals to the various actuator control valves. The microprocessor can be used to control all or nearly all functions of the apparatus. For example, when the chassis itself is to be moved or repositioned, the operator can activate a mode switch which will allow his body movements to control movement of the chassis. A forward movement will cause the drive motors of the chassis to move the entire apparatus forward. An angular movement will cause the chassis to turn and move in the direction of the lean.

The microprocessor can also incorporate a self-programming mode that will allow it to record and retain a record of movements made by the various components. The operator can subsequently recall and activate this program and cause the apparatus to repeat such actions. Such programs can be combined with other programs.

The microprocessor can continuously monitor the position of the various components of the boom in relation to fixed datum points and thus knows where the platform is with respect to these referents points. Potential utility of this capability is illustrated in the following example. In fruit picking, the operator may fill the fruit storage container at the platform and wish to empty it into a bulk handling field bin, which can be carried on the rear of the chassis. The operator can execute a "go-to-bin" mode switch (36) directive, and the platform will be moved through a sequence of positions to a position over the bin ready for release of the picked fruit. Next, by executing a "return-to-station" mode switch (36) directive, the platform will be returned by computer control to its previous position, whose position coordinates it recorded upon the initiation of the preceding "go-to-bin" mode directive.

Mode directive switches (36) can also be used to move the platform to a travel position, raise the outriggers and then switch the control mode to "travel". After repositioning the apparatus, the directive "activate arm" will cause displacement of the outriggers, bring the chassis to a level position and then release the platform from the travel position where it is kept immobile during travel.

Prior to permitting deployment of the work platform from the travel position the apparatus executes a self-leveling process. A suitable detector, for example a mercury switch, is used to locate the lowest corner or side. The appropriate outrigger or outriggers are then deployed to bring the chassis up to just past level. Then the remaining outriggers are deployed to level the chassis.

Mercury switches or gravity driven inclinometer can also be used to monitor tilt when the outriggers are up and the chassis is in the travel mode. Any tilt beyond a predetermined angle can result in a warning signal or stopping of movement and other actions.

The invention, particularly as described above and illustrated in FIGS. 1 to 5, is applicable to other forms of apparatus. For example, the invention can be applied to apparatus having a scissor or a multi-section articulated boom.

The invention is readily applicable to apparatus for other uses than fruit picking. As an example, the invention is applicable to apparatus for pruning and otherwise treating date palms and to harvesting of date palms. Date palms are pruned early in the growing cycle then fertilized by pollination, then covered from moisture and finally harvested. One or more of these operations, for example pruning and pollination, can be carried out by some form of apparatus mounted at the work station. A cutter can be mounted for pruning. Operation of the apparatus can then be from a position on the ground, the operator moving a directing member in the desired direction to obtain corresponding movement of the work station and the cutter. The cutter would also be actuated from the ground. Covering and harvesting would normally be carried out by someone positioned at the work station, their movements moving the actuating member, as in the fruit picking apparatus.

It will be appreciated that the invention can be incorporated in various forms of apparatus for various uses as illustrated and defined in subsequent sections. Thus, vehicles used in construction are an example; and another is de-icing apparatus for aircraft. The invention leaves both hands of the operator free for whatever operation is being carried out; the operator controls the movement of the apparatus by body movements. It is also seen that the control system can be applied in many other ways in which a task related action or motion is required.

Figure 7:
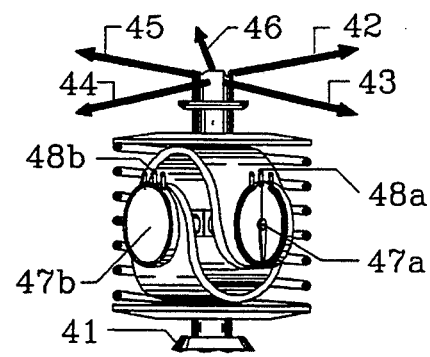
FIG. 7 illustrates a means for measuring and resolving operator body trunk lean attitude to derive platform movement directives.
Figure 8:
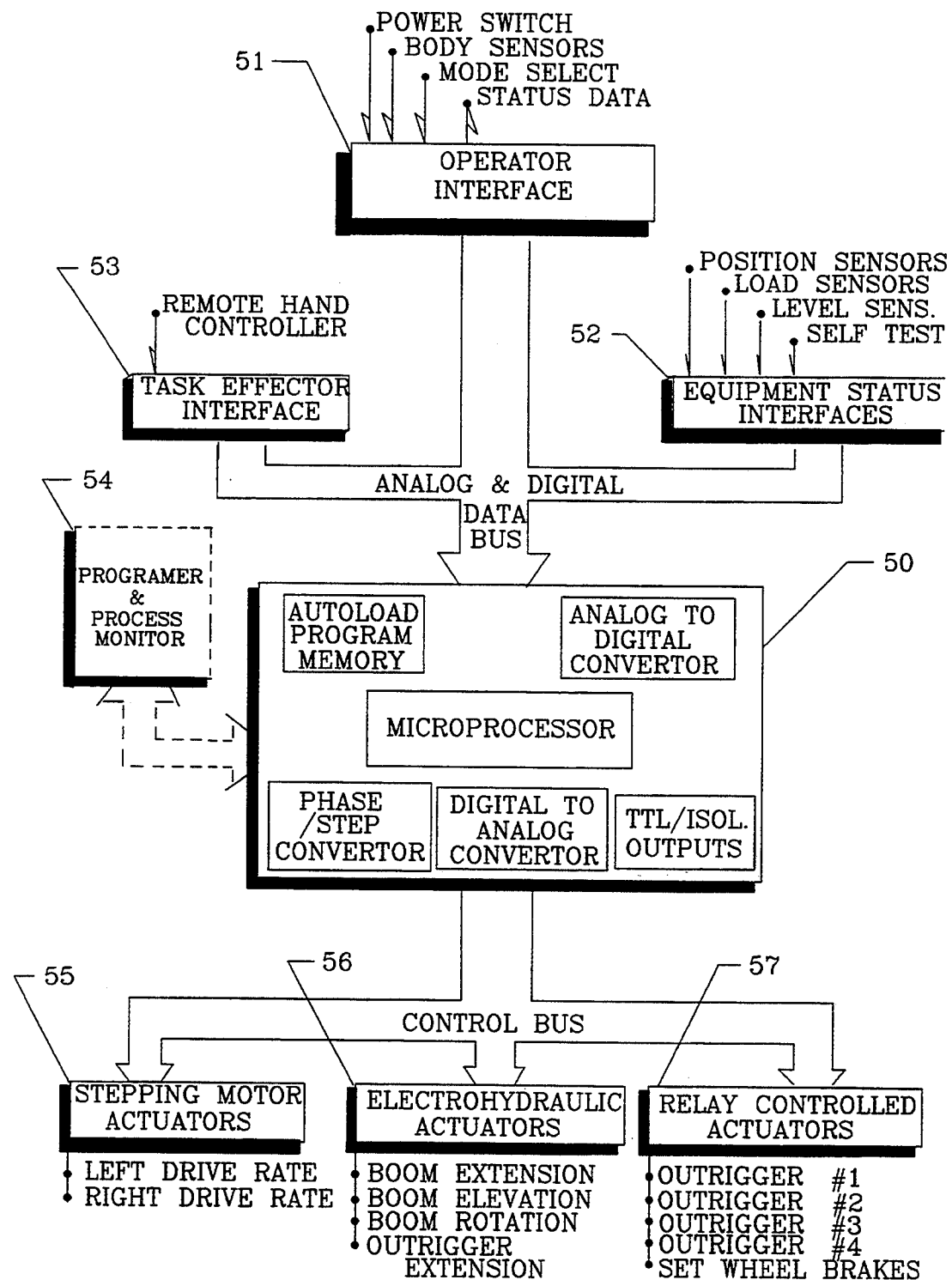
FIG. 8 illustrates diagrammatically a microprocessor with connections for required input and output channels.

FIG. 7 illustrates diagrammatically a form or arrangement of a directing member (31). The directing member is pivotally and rotationally mounted in a support member (41). Movement of the directing member in any direction by tilting, as indicated by arrows (42) (43) (44) (45) and (46), results in the angular displacement of one or the other, or both, of the proportional voltage divider inclinometer (47a) and (47b) mounted on members (31) and (41). The inclinometer (47a) and (47b) resolve the tilt of the directing member into two orthogonal angular components and produce voltage signals (48a) and (48b) which the operator interface (51) (FIG. 8) transmits to the control system microprocessor (50) (FIG. 8). Outputs from the "up" signal pressure-pad (34), "down" signal pressure-bar (35), "mode" signal select switches (36) and "go" signal power-on switches (37) are fed into the system microcomputer (50) through the operator interface (51) in an analogous manner. This microprocessor (50) in turn translates these voltage inputs into situationally appropriate actuator commands, generating direction and rate of movement by the work platform: thus, the direction and degree of the pickers body trunk tilt and leg actions is resolved and translated into direction of platform movement.

FIG. 8 illustrates diagrammatically a representative control system arrangement incorporating a microprocessor (50) capable of being programed to continuously adapt machine control responses to operator task performance directives in accordance with situational variables and operational constraints. The dynamic inputs to the microprocessor (50) typically derive from three principal sources; these are the operator interface (51), the equipment status interfaces (52) and any task effector interface (53) that may be installed. The processing and operational logic programing that is to be applied to translating these inputs into system control outputs is entered into the microprocessor (50) by means of a programmer and process monitor (54) interface. On-board the microprocessor (50) this programing will typically be stored in non-volatile memory units and will auto-run continuously whenever the microprocessor is turned on. The programmer and process monitor capability may be in the form of an integral part of the microprocessor (50), a portable plug-in module, or a remote communication-link connected system.

As is diagrammatically illustrated in FIG. 8 the principal control outputs from the microprocessor (50) are electrical signals directed to the individual machine actuators used to power movements of the mobile base and the suspension structure. In the tree crop machine these include digital pulse train outputs to electrical stepping motor actuators (55), infinitely variable voltage/current outputs to proportionally controlled electro-hydraulic valve actuators (56) and on/off electrical outputs to relay controlled actuators (57). A second category,that of information outputs, can be generated both intermittently and continuously by the microcomputer and delivered as appropriate to the user. Current operating status information including system readiness, mode, current configuration and limit warnings are delivered to the picker through the operator interface (51). This information can be conveniently generated and delivered in a full range of formats including; visual status indicator and/or data display, audio signal and/or voice message, and direct intervention including stop action or corrective response. Task specific programing is used to generate an additional body of informational outputs that can be called up as required through the programmer and process monitor (54). These include such collateral functions as fault diagnosis, maintenance status and discrete element performance testing.

The microprocessor is programmed to monitor the appropriate task performance related directive signals received from the controller's torso, hand and/or leg movements and to respond with coordinated proportional control signals to the apparatus' servo-valves that must be activated to satisfy the controller's directive. Thus, if the controller leans his torso forward to the extent that he signals for full rate forward movement and at the same time leans his torso slightly to the left, the microprocessor will interpret the directives and send simultaneous control signals to the valves that will cause the work station to move in accordance with the controller's desires. In this particular example these would include the valve that controls boom extension, the valve that controls boom elevation (to keep the work station on a level plane) and the valve that controls boom rotation. If at the same time, however, the controller's was to signal a desire for an upward or downward movement of the work platform, the microprocessor would have received that directive signal, processed it in combination with the other directives, and sent the appropriate control signal to the boom elevation valve to accomplish simultaneously with the other movements the desired height adjustment.

The microprocessor can be provided with any requisite number of preprogrammed operating modes and/or task specific action sequences needed to selectively and immediately adapt its control responses to optimize man-augmentation performance across a full span of tasking requirements. Typically, as applied to the tree harvesting machine system, these selectable modes will include both rectilinear-coordinate platform movement responses and polar-coordinate platform movement responses to operator directive inputs. They will also include switch-selectable automation modes capable of moving the work platform from any "work" point in its operating envelope to a "dump" position above a towed trailer and then returning to the "work" point or, alternatively, proceeding to a "docking" station (FIG. 2.) for surface movements by the movable base.

The microprocessor can have a self-programming mode that will allow it to record and retain a record of a sequence of operator directed movements being made by the various components of the apparatus. The operator will then be able to recall and activate this program and cause the machine to repeat the actions of the machine recorded during the programming phase. Such programs can be combined with other programs and executed as part of a task specific sequence of movements.

The microprocessor is continually monitoring the positions of the various components of the boom in relation to a fixed coordinate system. As a result, it always "knows" where the work station is in relation to other parts of the apparatus. In a fruit-tree picking operation, the operator may fill the fruit storage container on the work platform and wish to empty it into a field bulk-handling bin, which is carried either on a fork-lift-like attachment or bin trailer at the rear of the chassis. Because of the microprocessor's relational knowledge, the operator can execute a go to "dump" mode command, and the work station will automatically move to a position over the field bin into which the operator can release the fruit stored in the work station. Upon completion, the operator can execute a return to "work" point mode command, and the work station will automatically return to its position immediately before the "dump" command was executed.

A similar mode command will be used to move the work station to a pre-designated travel station, raise the self-leveling outriggers and then switch the control mode to "travel". The operator can then activate the propulsion system of the chassis and reposition the apparatus. When repositioned, the operator can execute the "activate arm" mode, and the outriggers will deploy and bring the chassis to a level position and then release the work station from the travel mode where it has been kept immobile during the travel phase.

The pedestal boom combination is mounted on a movable chassis. The microprocessor is designed to provide signals to all activating valves and motors on the apparatus. When the chassis itself is to be moved or repositioned, the operator activates a mode control switch which allows his torso, arm and/or leg movements to control the ground movement of the entire chassis. The operator, by leaning forward when the machine is in the "travel" mode, will send a signal to the microprocessor that in turn will activate the drive motors of the chassis mechanism and cause the entire apparatus to move forward. Body rotation movements to the left or right will cause the chassis to curve its path in the direction of the rotation, with the turn radius proportional to the angle of rotation. For instance, a full 90-degree rotation of the operator's body trunk without any forward bending of the torso will cause the chassis to execute the most radical left or right turn, depending upon the direction of the lean, permitted by the chassis design.

The microprocessor can also serve a number of other functions. Some of these can relate to maximizing operational safety. The microprocessor can log major component operating hours, record maintenance work done and provide system diagnostics to pinpoint maintenance malfunctions.

The apparatus can have an option that will switch the control from the work station to a hand-held control device that can be used to control the apparatus from a remote location away from the machine. Such a control system an communicate with the microprocessor by various means including pneumatic, electrical, optical fiber, and infra-red or radio frequency radiation.

The apparatus can have a self-leveling system. It can employ a two-axis gravity sensor such as a mercury switch array to locate the lowest corner or side of the apparatus. Upon the operator's signal it then deploys outriggers at the lowest corner or side of the apparatus to lift the apparatus to the sensors level position. It then deploys the remaining outriggers to lock the entire chassis in the level position. When the chassis is level and all the outriggers have been deployed, the system sends a signal to the microprocessor which activates the work station controls that operate the boom. If a level position is not reached, the boom controls will not be activated.

Gravity sensors in conjunction with the microcomputer can also be used to dynamically monitor the degree of tilt when the outriggers are up and the apparatus is in the travel mode. If the angle of incline measured by the sensors reaches a preprogrammed point the microprocessor can act on this signal in any number of ways; it can sound and/or flash a signal, suspend further movement by the chassis drive motors and lock the brakes or cause other similar actions or combination of actions to take place.

The microprocessor can also be programmed to go through a series of diagnostic tests when the apparatus is started after it has been idle for a designated period of time. After the microprocessor has run its own built-in test (BIT), it performs diagnostic tests on all the safety systems that it controls as well as operating system tests. The microprocessor can be programmed to respond to any system malfunctions in a number of different ways, from making a maintenance note for delivery upon periodic interrogation, signaling the operator, intervening to deny deployment of the suspension boom, or to the act of shutting down the entire apparatus.

Preceding sections of this disclosure have focused upon the suspended man-aboard work platform or man positioner applications aspect of this adaptive control man augmentation system invention. The succeeding sections will focus on its application to work station applications where the man is stationed at a position separate from the work platform and the work platform embodies a material manipulator or other task effector.

Figures 9, 9A, 9B:
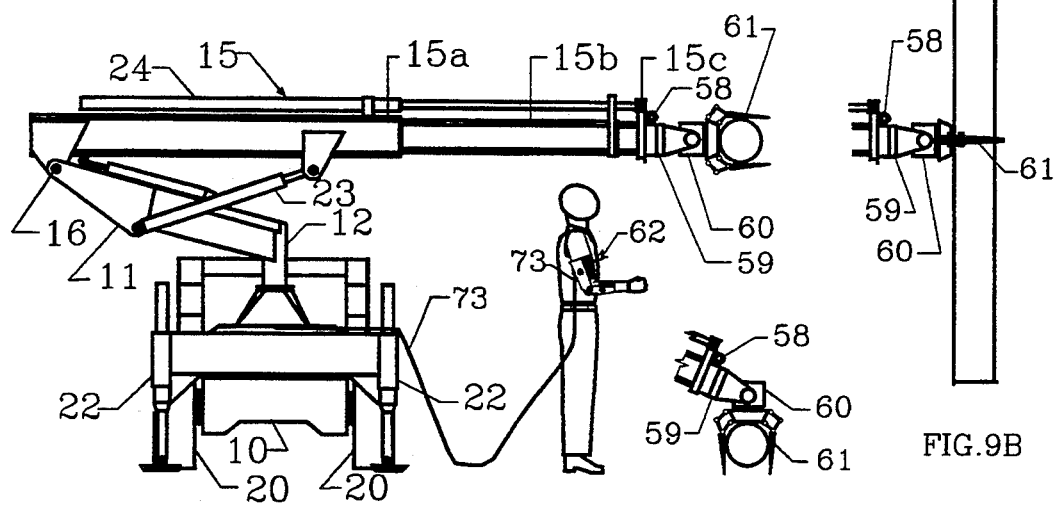
FIG. 9 is a side-view of the basic vehicle illustrated in FIGS. 1 through 5.
FIGS. 9A and 9B show the basic vehicle of FIG. 9 configured with an articulated load-handling work platform directed by a ground-based operator.

FIGS. 9, 9A and 9B present and illustrate an alternate embodiment of this invention as depicted in FIGS. 1-5. It differs from the depiction of FIGS. 1-5 in that the man-occupied work platform (17) is replaced by an articulated load manipulator work platform (58). The load manipulator depicted in FIG. 9 is composed of a section (59) capable of electro-hydraulic powered rotation about the longitudinal axis of the suspense arm (15c), an intermediate section (60) capable of electro-hydraulic powered rotation about an axis perpendicular to the longitudinal axis of the suspense arm (15c), and a terminal section (61) in the form of an electro-hydraulic powered multi-finger load grapple.

The apparatus depicted in FIG. 9 also differs from that illustrated in FIGS. 1-7 in that the task controller is located on the ground and the saddle seat-vest controller interface of FIGS. 6-7 employed in the man-occupied work platform (17) is exchanged for an arm-mounted controller interface (62).

FIGS. 9, 9A and 9B together with FIGS. 2-5, serve to illustrate the apparatus in use. The operation spatial positioning envelope and movement activation capabilities of the terminal arm (15c) with the man-occupied platform attached, are identical. FIGS. 9, 9A and 9B serve to illustrate the manner in which these base system capabilities can be readily adapted to load handling and manipulation. In this illustration, the object being lifted, positioned and oriented is a length of pipe, such as that used for relocatable orchard irrigation systems. The rotation, elevation and extension capabilities serve to transport the load to any selected spatial location within the operational envelope of the system. At the selected spatial location, the axially-aligned rotator section (59) can then be directed to place the object into a selected orientation plane. The intermediate, cross-axis rotator section (60) can then be directed to align the load to any selected angular position within the orientation plane. The two axes of rotation afforded by the grapple work platform expands the control requirements from three to a total of five.

Figure 10A:
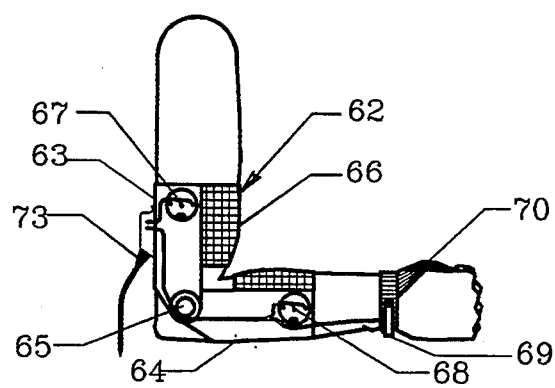
FIGS. 10A & 10B are side plan views of an arm-mounted configuration of the body-located controller interface.
Figure 10B:
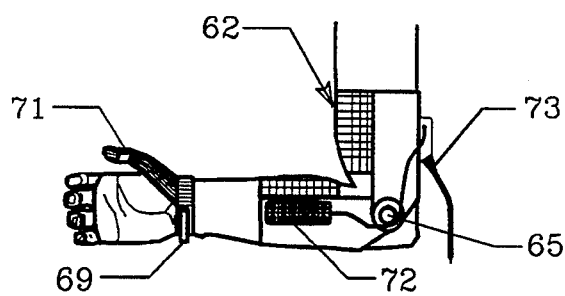

FIGS. 10A and 10B are right- and left-side views of the arm-mounted controller interface (62). The structural base for the controller is provided by two semi-rigid, trough-shaped sections formed to fit along the back half of the upper arm (63) and along the bottom half of the lower arm (64). The upper arm base and lower arm base are joined by means of rotary hinges (65) located on each side of the elbow and positioned so as to center along the arm's elbow hinge line.

The base troughs are bonded or mechanically attached to elastic sleeving, which serves to hold the mechanical assembly to the arm. Note that the combined interactions of sleeving (66), hinges (65) and the base sections (65 & 64) also serve to establish and maintain proper positioning of the controller interface through a full range of arm movements.

As is shown in FIG. 10A, gravity-driven planer inclinometers capable of generating precision electrical outputs proportional to angular orientation are affixed to the upper arm base (67) and lower arm base (68). Located as shown, the upper sensor (67) serves to measure angular positioning of the upper arm and the lower sensor (68) measures angular positioning of the lower arm.

A horseshoe-shaped, gravity-driven inclinometer (69) is clasped about the wrist of the user and serves to generate precision electrical outputs proportional to the angular rotation of the wrist. Attached to the wrist clasp is the base of an elastic thumb glove (70) that holds a single pull momentary contact electrical switch (71) clasped atop the first joint of the user's thumb. This switch serves as a "deadman" switch or "GO" button for the control system.

FIG. 10B shows the reverse side of the controller interface. A response selector input device (72) is shown affixed to the lower arm trough of the controller interface. This selector device serves to input commands to the adjunct computer, FIG. 8, that direct how it is to process subsequent controller inputs into actuator control commands and consequent operational response by the machine system. As depicted in FIG. 10B, this selector is in the form of an interlocked button (a single button active at a time) keypad providing a 12-alternative response selection capability.

In the embodiment presented in FIGS. 10A and 10B, the control signal outputs of the arm-mounted controller interface are transmitted to the computer input aboard the equipment carriage by means of a flexible, insulated and environmentally protected cable (73). Where greater man positioning mobility, electrical isolation or other task-related requirements apply, this control signal linkage can be effected by means of fiber optics, radio, infrared or other electromagnetic processes.

Figure 11A:
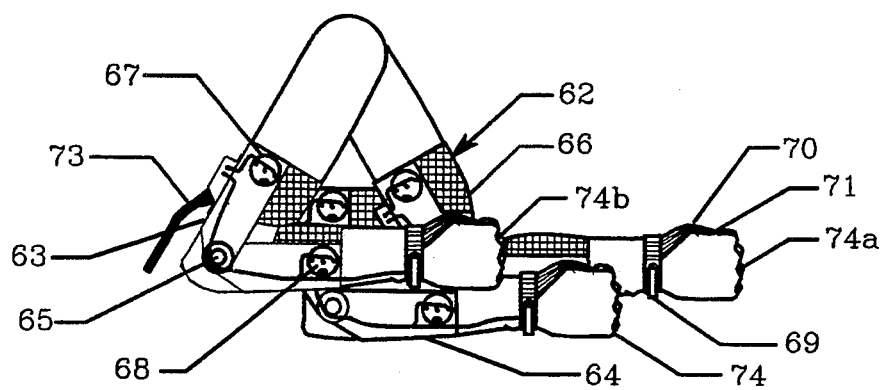
FIGS. 11A, 11B & 11C illustrate diagrammatically the relationship between an operator's arm positioning and attendant directional machine movement responses.
Figure 11B:
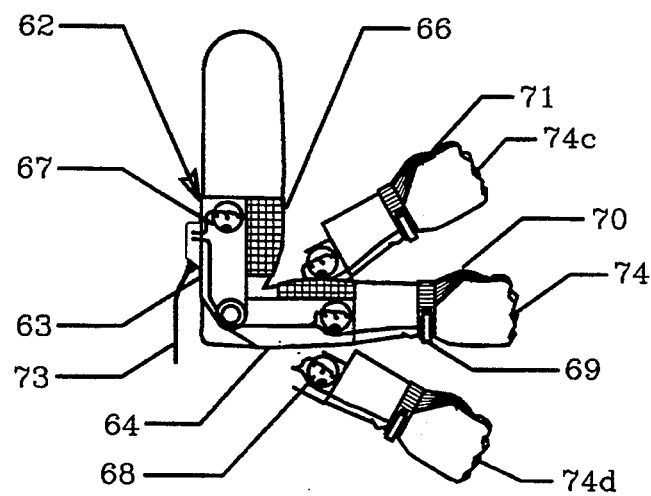
Figure 11C:
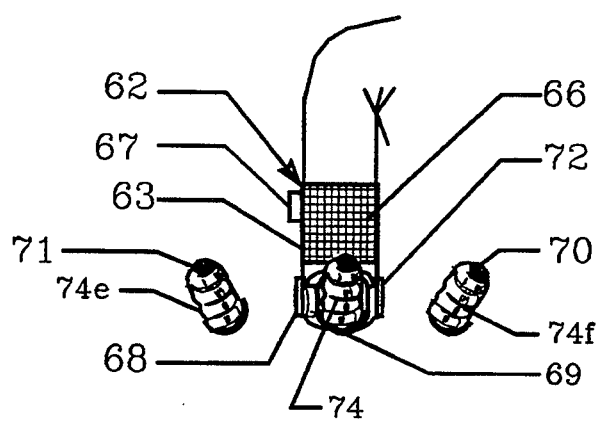

Operation of this arm-mounted controller interface are illustrated in FIGS. 11A, 11B and 11C. The Rotation of the upper arm as depicted in FIG. 11A is detected and measured by the inclinometer (69) and output as an electrical signal whose magnitude is proportional to the arm's angle. It is intuitively convenient to apply this signal to control activation of direction and rate of system element movement along a horizontal or radial axis. In the present application, it is employed in three alternate response modes, as selected by the man. In the rectilinear response mode, it directs horizontal extension or retraction of the grapple attached to the end of the boom by means of vector resolved outputs to the extension and elevation cylinders generated by the computer. In the polar mode, it controls radial extension direction and rate by outputting to only the extension drive (24) activator piston. The third alternative mode is to apply the output to control the rate of forward or reverse movement of the vehicle along the ground.

In FIG. 11A, the man's hand is shown in a clinched or closed-fist condition, with the thumb overlapped by the first two fingers. In this posture, the "deadman" or "GO" switch is activated by pressure of the finger, thus signaling the computer to execute the input directives using the response mode selection presently being transmitted. Release of the finger pressure on this switch signals the computer to halt all actuators and "freeze" the machine system in its present position.

The illustration provided as FIG. 11B focuses on the movement of the lower arm as it is rotated in the vertical plane. In a process identical to that defined for operation as an input sensor, the inclinometer (68) attached to the interface continually measures the angular positioning of the lower arm and outputs an electrical signal whose magnitude is proportional to that signal. It is intuitively convenient to apply this signal to controlling rectilinear movement in the vertical plane, or vertical rotation in the polar plane, i.e., to elevate and depress the suspension arm or to rotate the grapple about its center section axis (60). Selection and actuation of these modes are through the selector panel (72) and "deadman" (71) switch.

Operation of the wrist-mounted rotation sensor (69) is illustrated in FIG. 11C. The horseshoe-shaped, gravity driven inclinometer (69) is held in place on the wrist section of the arm and rotates in unison with the wrist. The magnitude of the resulting electrical signal, which is proportional to the wrist's angular orientation, is intuitively convenient for commanding rotation of the lift arm about the vertical axis in both rectilinear and polar modes. It is also intuitively suited to controlling rotational positioning of the grapple platform about the suspense arm axis through activation of the rotary drive incorporated in the mounting section (59).

Figure 12:
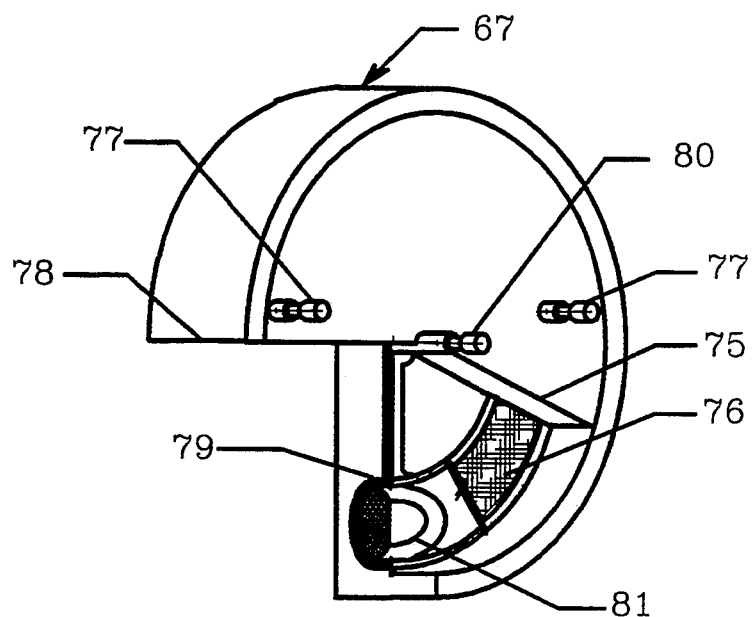
FIG. 12 is a sectional view of a single axis, high-sensitivity inclinometer configured to meet the body-mounted controller needs.

FIG. 12 is a sectional view of a gravity-driven inclinometer tailored to fit the needs of the body-mounted control interfaces. It is a potentiometer or voltage divider instrument that employs a face section (75) of non-conductor material with a flat-faced, ribbon-shaped linear resistor strip (76) bonded to its inner face. The ends or selected points along the strip are electrically connected to two wiring terminals (77) that serve to connect the voltage supply across the resistor. The rear section (78) is made of non-conducting material. This rear section embodies a circumferential groove (79), whose channel face is of a low-resistance conductor material that may have been plated or otherwise bonded to this surface. Said conductor face is electrically connected to an output connector terminal (80). A contact wiper (81) consisting of a mercury bead that also functions as the gravity seeker, serves to transfer a current to the output terminal that is determined by its electrical position along the electrical quadrant of the resistor ribbon. The two sections are sealed together, and internal air is removed or replaced by a non-conductive, mercury-compatible gas or liquid at the point of final assembly. Signal smoothing to eliminate any unwanted tendencies for over-travel or oscillation of the contact wiper are eliminated by external circuitry and/or the computer signal processing sub-program.

Figure 13A:
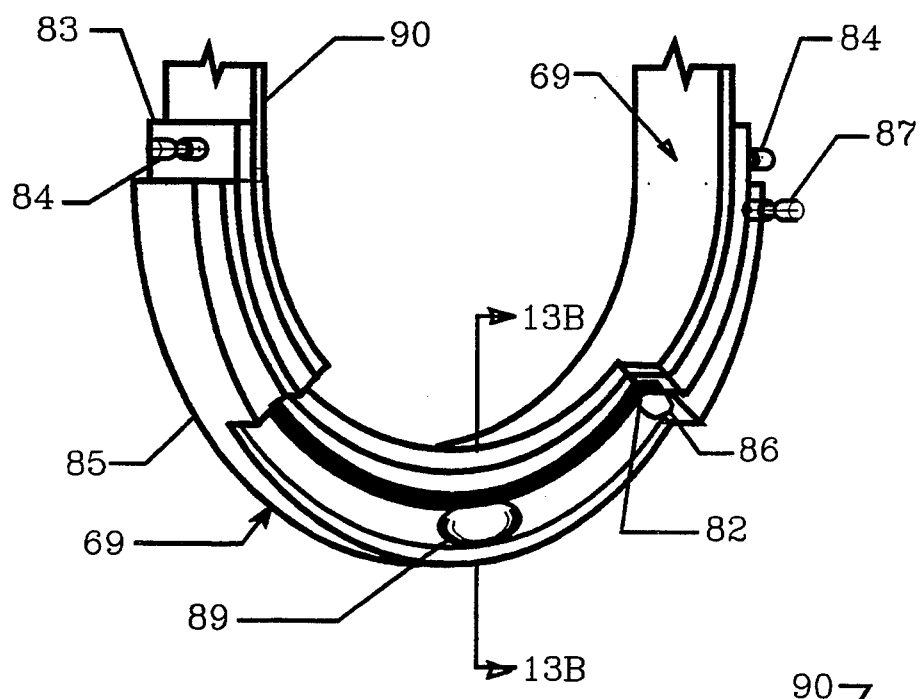
FIGS. 13A & 13B are sectional views of a "U"-shaped version of the inclinometer illustrated in FIG. 12.
Figure 13B:
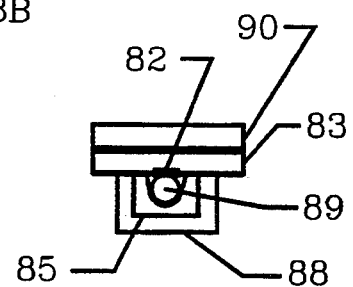

The sectional views presented in FIGS. 13A and 13B show an alternate configuration of a gravity-driven inclinometer that is designed for wrist mounting. Like the device depicted in FIG. 12, this inclinometer is a potentiometer-type voltage divider instrument. In this horseshoe-shaped configuration, the ribbon-shaped, linear resistor strip (82) is inset and bonded into a non-conductive structural material in the form of a radially curved ribbon section (83). The two wiring terminals (84) are connected to the ends of the resistor ribbon and mechanically supported by the structure section (83). A mating radially curved section (85) made of low-resistance, electrically conductive material and incorporating a grooved radial channel (86), is affixed to the ribbon resistor bearing section (83). A signal output wiring terminal (87) is connected to the channel section (86) and extends through an electrically insulating outer coating (88) that is bonded to the exterior of the grooved channel section. A mercury ball contact wiper (89) is employed for bridging the space between the resistor ribbon (82) and the grooved conductor ring (85) at the gravity-dictated, angular position along the voltage divider resistor strip. A means for attaching the sensor to the wrist and holding it in angular alignment is shown in FIGS. 13A and 13B in the form of a strip (90) affixed to the inner radius of the ribbon mounting section (83).

FIGS. 14 and 14A are side views of FIGS. 15, 15A and 15B are top views of a materials handling machine configured for operation by an expanded-capability, adaptive control system interface. The machine system depicted in FIGS. 14 and 15 consists of the system defined in FIGS. 1-5 modified by deletion of the man-aboard work platform at the end of the suspense arm; the attachment of an articulated lift platform on the end of the lift arm and the installation of a controller platform attached to the engine end of the machine carriage.

As shown in FIG. 14, the articulated work platform (91) is designed to employ the same platform leveler hydraulic link (30) powered system utilized for the man-aboard platform employed in the FIG. 1-5 system. The load handling platform (91) is similar to a variety of configurations in current use, and consists of a vertical platform (92) fitted with swing down fork arms suitable for handling bulk bins or palletized loads. This load handler platform (91) is attached to the end of the lift arm by means of an articulation interface powered by electro-hydraulic activators. Two extend-through piston rod mounting cylinders (94 and 95) serve to suspend the work platform and to provide a limited range of vertical movement to facilitate and expedite on-load and off-load operations. These mounting cylinders are structurally connected to a vertical axial shaft mounted in a cylindrical sleeve bearing (96). The load platform is provided 180 degrees of rotation, centered along the suspension arm axis by this mounting bearing and is positioned about this axis by means of a rotary activator (97).

The controller station (99) attached to the power plant end of the carriage is depicted in FIGS. 14 and 15 as a tubular body section sized to support the controller to the waist in order to facilitate freedom of upper torso movement. The enlarged base section (100) is sized to provide clearance for free foot movement and placement.

The envelope of handling capability afforded by this articulated load handler is identical to that illustrated in FIGS. 1-5 for the man-positioner platform. The load-handling process capabilities are illustrated in FIGS. 12 and 13. As is illustrated in FIGS. 14, 14A, 15, 15A and 15B the selected structure permits on-load/off-load operations to be performed from close proximity of the chassis to the full-arm extension capability. The articulation of the load platform facilitates load on-load/off-load match-up with the full range of load positioning. A properly configured, adaptive control interface and computer control processing program is needed in order to make full and efficient use of the capabilities of the machine configuration defined above and to accomplish smooth, accurate and rapid load processing with minimum distraction and demands imposed on the controller.

FIG. 16 provides a view of the controller station (99) with the platform and surround structure sectioned to expose the controller (40) and interface linkages. To meet the control requirements of this load handler system application the body mounted interface consists of a vest-back attached biaxial inclinometer sensor unit (100) integrated with an arm mounted tri-axial unit (62).

The biaxial unit is attached to the center of the controller platform by a flexible, spring-return extendible umbilical tube (101). This rotationally ridged umbilical tube also serves to maintain reference axial alignment for the back mounted inclinometer package and as conduit for electrical supply and signal lines. A pressure actuated circumferential "GO" switch (102) is mounted atop the platform base plate for actuation by foot pressure.

The arm mounted interface also provides a thumb mounted, finger activated, "GO" switch. In this bulk handler application it is operationally convenient to program the computer interface to respond to actuation of the thumb mounted "GO" switch for directives in work platform orientation, load pickup or off-load operation; and to the foot activated "GO" switch for direction in point-to-point platform transfer movements.

The manner in which the arm mounted controller interface is employed for directing the bulk handler work platform is defined and illustrated in FIGS. 17A, 17B & 17C. Fork assembly articulation control is presented in FIG. 17A. Rotation of the fork assembly about the swivel joint is directed by means of the wrist mounted sensor (69). Clockwise rotation of the wrist (103a) generates a directive signal output, denoted by the vector arrow (103b), whose magnitude is proportional to the angular positioning of the wrist. Counter-clockwise rotation of the wrist beyond the center null section of the sensor (104a) generates a comparable directive signal (104b) for fork assembly rotation in the counter-clockwise direction. The resulting azimuth angle, between the center axis paralleling the fork tines and the longitudinal axis of the support arm, is measured by the output of a position angle sensor (98) fitted to the swivel axis.

The "In" and "Out" movement of the fork assembly is controlled by rotation of the upper arm sensor (67) in the manner illustrated in FIG. 17B. Extension of the arm (105a) produces an "Out" signal (105b) proportional to the angular positioning of the upper arm. A reverse "In" signal (106b) of proportional magnitude is produced by rearward rotation (106a) of the upper arm sensor.

The response of the machine system to the arm position generated "In"-"Out" directive inputs (105a & 106a) is movement along the fork defined axis of the work platform. This task efficient adaptive control response mode is achieved by programming installed in the computer interface. Programming that relates the directive inputs to the suspension system positional sensor inputs to generate the combination of actuator outputs necessary to produce the required platform movement response.

FIG. 17C illustrates the manner in which direction and rate of vertical movement of the bulk handler work platform is controlled. The direction and rate of such movement is determined by signal output of the controllers forearm mounted sensor (68). Rotating the forearm above the horizontal "null" position (107a) causes the gravity driven system to generate an "Up" output directive signal (107b) proportional to the forearm elevation angle. Depressing the forearm below the horizontal "null" position (108a) produces an equivalent "Down" directive (108b). The bulk handler platform illustrated in FIGS. 14 & 17C provides a vernier up-down movement capability (95) in its support structure to facilitate load match-up and release. Employment of this vernier capability is activated by depressing the appropriate button in the forearm mounted mode selector (72) shown in FIG. 10B. When operated in the non-vernier mode the system employs the suspension arm to accomplish vertical plane repositioning. In this mode the computer responds to forearm generated up-down directives (107b & 108b) by outputting coordinated actuator control signals that produce rectilinear vertical movement of the work platform.

The back mounted biaxial inclinometer sensor controller interface (100) is employed to direct omni-directional horizontal planer movement and positioning of the work platform. The process employed to generate the requisite control directive outputs are illustrated in FIGS. 18A & 18B. The two gravity driven inclinometer sensors in this controller interface are mounted with their vertical center axes parallel and their horizontal axes at right angles. The inclinometers are thereby each able to measure any degree of controller body inclination in their plane of reference as illustrated in FIG. 18B. When the controllers body is aligned facing along the horizontal axis of one of the sensors then a left side lean (109a) or right side lean (111a) will generate a sensor output (109b) or (111b) proportional to the body trunk's angle of inclination. Similarly, leaning along the front to back axis (110a) or (112a) will produce the proportional outputs (110b) or (112b).

When the controller's body trunk is tilted in a plane other than one of the two cardinal planes illustrated in FIG. 18B the increment of lean parallel to each of the two cardinal planes is measured by the inclinometers. With the planer axes defined by the two inclinometers held in a known fixed (or continuously measured) orientation with respect to the machine system's prime coordinate system, the sensor derived incremental outputs can be readily mathematically processed by the computer to define both direction and velocity of platform movement being input by the controller. The application of this control process is illustrated in FIG. 19.

The non-rotatable umbilical cable from the back mounted controller is attached to the center of the controller platform with an angular orientation that aligns the horizontal planer axis of one inclinometer parallel with B-B the longitudinal center axis of the system's mobile base. The controller depicted in FIG. 19 is shown in a side lean posture that defines the direction and rate that the work platform end of the boom is to move. This body trunk position (113a) produces an output signal from the axially aligned inclinometer represented by the vector arrow (114) and an output signal from the cross axis inclinometer represented by vector arrow (115). Mathematical processing by the computer of these signals serve to define the output directive signal (113b) being generated by the controllers body trunk positioning in terms that facilitate its generation of the actuator control outputs needed to execute the controllers directive.

The actuator control outputs generated by the computer in response to the controller's body trunk generated directive inputs are determined by the programing installed in the adjunct computer. This programmability attribute of the computer provides a new and highly flexible means of tailoring a machine's systems dynamic responses to controller inputs to meet task application performance requirements. The application of this task adaptability to the horizontal planar movement of the bulk handler work platform is illustrated in FIGS. 19, 19A and 19B. In this task application the most efficient method is to move the platform along straight line paths that parallel the directional input provided by the controller; while simultaneously rotating the work platform (92) to maintain its established axial orientation.

The vector diagrams (116), (117) & (118) provided in FIGS. 19, 19A and 19B illustrate the three continually changing actuator outputs (boom rotation, boom extension and work platform rotation) that the computer controls in order to provide the selected dynamic response.

Figures 20, 21A:
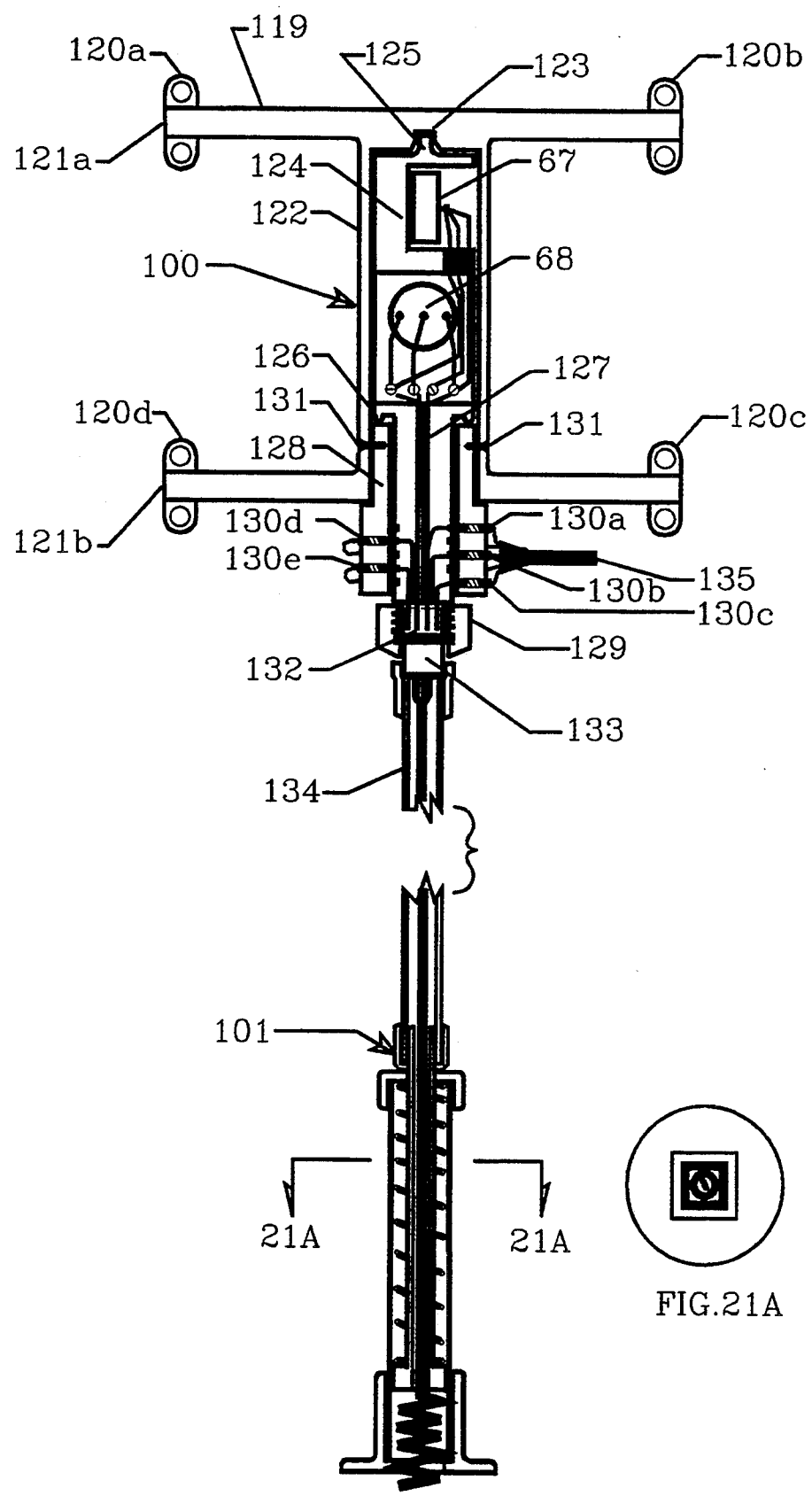
FIGS. 20 and 21A are sectional cutaway views of the vest-mounted portion of the controller interface to define its mechanical, electrical and functional attributes.

FIG. 20 provides a cut-away view of a back-mounted controller interface capable of providing the operational freedom and accommodating the multi-axial outputs needed by a man operating the task effector from a controller station not co-located with the work platform.

The controller (100) employs a mounting structure that can be attached to a vest or other conformable harness capable of holding the unit aligned with the spinal axis of the controller. The integrated support structure (119) depicted here incorporates four dual fastener brackets (120a, 120b, 120c and 120d), two linkbars (121a and 120b) and a center-located, tubular housing (122), open at the bottom end and closed at the upper end. The upper end-cap contains a centering bearing cavity (123) accurately centered with the tube axis. The sensor and commutator mounting element (124) is in the form of a stepped cylinder with a hemispheric top center bearing stub shaft (125) at the top, a slip-fit diameter section with formed cavities for mounting two of the gravity-driven inclinometer sensors (67 and 68) with their vertical axes of measurement parallel and their planes of measurement oriented at right angles. The bottom face of this full-diameter section is formed with a reduced-area thrust bearing ring surface (126). A reduced diameter attachment section (127) extends down beyond the bottom sleeve structure (128). This attachment section (127) has a center bore that serves as a wire conduit and terminates with a polarized, multi-terminal plug receptacle (129). The lower outside end of the attachment section (127) is fitted with electrical commutator rings wired to the plug receptacle (129). The bottom sleeve structure (128) is configured to provide thrust-bearing support for the sensor commutator mounting element (124) and housings for the commutator wiper contacts (130). This bottom sleeve structure is secured into the outer tube housing (122) by means of retainer screws (131).

The plug receptacle (132) at the base of the sensor and commutator mounting element (124) mates with a connector plug (133) on the end of a flexible conduit (134), and as FIG. 21A shows, serves to provide electrical circuit line transmission and also locks the rotational position of the element to the rotational position of the conduit. Salient characteristics of this conduit are that it provide longitudinal flexibility that permits axial bending or curving while remaining rotationally rigid about the center axis of the conduit. This conduit is attached to a spring-retracted/telescoping mounting device (101) configured to establish and maintain rotational indexing of the connector conduit.

This invention is not to be limited by the embodiments shown in the drawings and described in the description which are given by way of example and not of limitation, but only in accordance with the scope of the appended claims.

What is claimed is:

1. An adaptive control man-augmentation system for controllably moving a load manipulator, comprising:

a support structure including at least one movable member supporting a load manipulation means;

means for moving said at least one movable member to move said load manipulation means in preselected directions;

means for continuously monitoring the position of said load manipulating means relative to a predetermined support structure coordinate;

a directing member means including means for connection of said directing member to an operator's body part for movement therewith, said directing member means being an arm-mounted controller interface means;

said arm-mounted controller interface means comprising trough-shaped sections attached to upper and lower arm sections respectively, and motion responsive means in said trough-shaped sections responsive to relative movement of said upper and lower arm;

control means for determining movement of said directing member by said operator and resolving said movement relative to two axes normal to each other and in a substantially horizontal plane and having a substantially fixed relationship to said support structure;

said control means including means for producing control signals related to the direction of said movement relative to said axes and related to the displacement of said directing member, to move said load manipulation means in the direction of said movement at a speed relative to said displacement, and further including a micro-processor adapted to receive signals produced by said operator's body part positioning and to generate said control signals, said micro-processor being programmable so as to transpose said operator's body reflex generated movements into precise work station movements, maintaining said load manipulator at a predetermined position.

2. The system according to claim 1 in which said motion responsive means comprise gravity-driven planar inclinometer for generating precision electrical outputs proportional to angular orientation of said upper and lower arm.

3. The system according to claim 2 in which said gravity-driven planar inclinometer comprises; a nonconducting face section; a flat-faced, ribbon-shaped linear resistive strip bonded to said non-conductive face section; terminal connecting means connecting supply voltage across said linear resistive strip; a rear-section attached to said face-section behind said linear resistive strip, said rear section having a circumferential groove; a low-resistance conductive material in said circumferential groove; an output terminal connected to said low resistance conductive material; gravity responsive contact wiping means connecting said linear resistive strip to said output terminal through said low-resistance conductive material in said circumferential groove; whereby the relative position of said gravity responsive contact wiping means indicates the position of a body part.

4. The system according to claim 3 in which said gravity driven planar inclinometer means is in a horseshoe shape for connecting to the wrist to indicate wrist movement.

5. The system according to claim 1 in which said directing member means includes a motion responsive means mounted on the wrist of said arm for generating electrical outputs proportional to angular rotation of the wrist.

6. The system according to claim 5 including a thumb glove for mounting on the thumb of said arm; switch means on said thumb glove for activating operation of said means for moving said load manipulating means.

7. An adaptive control man-augmentation system for controllably moving a load manipulator, comprising:

a support structure including at least one movable member supporting a load manipulation means;

means for moving said at least one movable member to move said load manipulation means in preselected directions;

means for continuously monitoring the position of said load manipulating means relative to a predetermined support structure coordinate;

a directing member means including means for connection of said directing member to an operator's body part for movement therewith, said directing member means being a body mounted interface attached to and responsive to movements of the upper torso;

said body mounted interface comprises a vest-back attached biaxial inclinometer sensor means, said biaxial inclinometer means responsive to forward, backward, and side to side movements of said torso for generating electrical outputs proportional to said torso movements;

control means for determining movement of said directing member by said operator and resolving said movement relative to two axes normal to each other and in a substantially horizontal plane and having a substantially fixed relationship to said support structure;

said control means including means for producing control signals related to the direction of said movement relative to said axes and related to the displacement of said directing member, to move said load manipulation means in the direction of said movement at a speed relative to said displacement, and further including a micro-processor adapted to receive signals produced by said operator's body part positioning and to generate said control signals, said micro-processor being programmable so as to transpose said operator's body reflex generated movements into precise work station movements, maintaining said load manipulator at a predetermined position.

8. A gravity-driven inclinometer for indicating relative body movements comprising; a non-conducting face section; a flat-faced, ribbon-shaped linear resistive strip bonded to said non-conductive face section; terminal connecting means connecting supply voltage across said linear resistive strip; a rear-section attached to said face-section behind said linear resistive strip, said rear section having a circumferential groove; a low-resistance conductive material in said circumferential groove; an output terminal connected to said low resistance conductive material; gravity responsive contact wiping means connecting said linear resistive strip to said output terminal through said low-resistance conductive material in said circumferential groove; whereby the relative position of said gravity responsive contact wiping means indicates the position of a body part.

9. The inclinometer according to claim 8 in which said gravity driven planar inclinometer means is in a horse-shoe shape for connecting to the wrist to indicate wrist movement.

* * * * *